United States Patent

Goodings et al.

[15] 3,702,409
[45] Nov. 7, 1972

[54] NEUTRON COUNTER FILLED WITH BORON TRIFLUORIDE GAS

[72] Inventors: Anthony Goodings, Winfrith; John Walgate Leake, Harwell, both of England

[73] Assignee: United Kingdom Atomic Energy Authority, London, England

[22] Filed: June 29, 1970

[21] Appl. No.: 50,762

[30] Foreign Application Priority Data

July 1, 1969 Great Britain..........33,290/69

[52] U.S. Cl.................313/61 D, 313/93, 313/242, 313/281
[51] Int. Cl.............................H01j 39/32
[58] Field of Search.....313/61 R, 61 D, 93, 281, 242

[56] References Cited

UNITED STATES PATENTS

| | | |
|---|---|---|
| 2,444,915 | 7/1948 | Cade....................313/242 X |
| 2,505,919 | 5/1950 | Simpson, Jr.................313/93 |
| 2,605,435 | 7/1952 | Krasnow et al.............313/93 |
| 2,835,839 | 5/1958 | Borzin.........................313/93 |
| 2,845,560 | 7/1958 | Curtis et al. .............313/93 X |
| 2,879,423 | 3/1959 | Bayard ........................313/93 |

Primary Examiner—Roy Lake
Assistant Examiner—Palmer C. Demeo
Attorney—Larson, Taylor & Hinds

[57] ABSTRACT

Failure of neutron detecting chambers can be avoided if the results of fault analysis are properly analyzed. In this invention the analysis leads to a redisposition, redesign and reorientation of ceramic components to avoid or delay their deterioration during use of the chamber.

5 Claims, 1 Drawing Figure

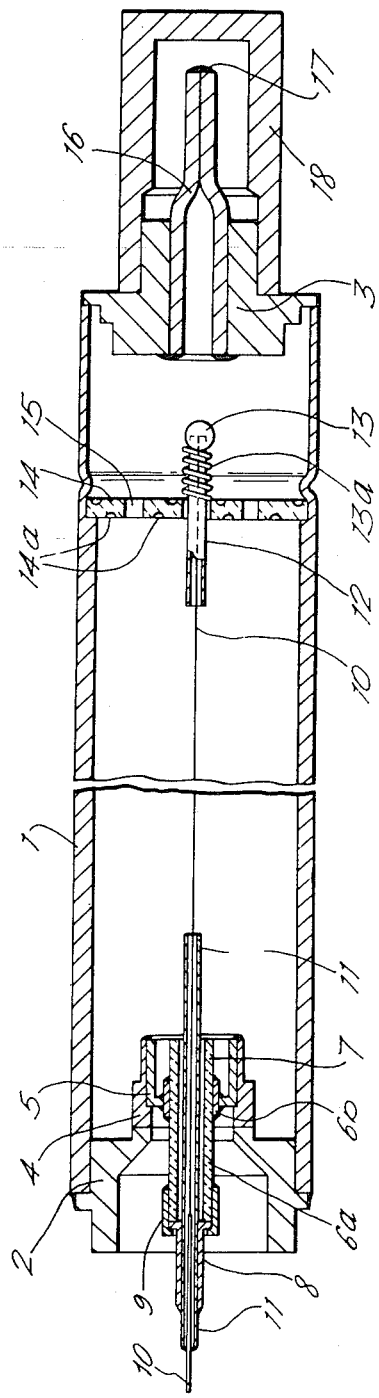

NEUTRON COUNTER FILLED WITH BORON TRIFLUORIDE GAS

BACKGROUND OF THE INVENTION

This invention relates to neutron counters for detecting and measuring neutron flux (i.e. neutrons/cm²/sec).

An important method of detecting neutrons and measuring neutron flux is that of employing the $B^{10}(n\alpha)Li^7$ reaction and as a matter of practicality this involves constructing an ionization chamber which is either coated internally with a boron containing compound or which contains a counter volume charged with BF3 gas. As constructed hitherto these detectors have a somewhat limited operational life and it is an object of the present invention to provide an improved design.

An important cause of failure is the transfer by migration or deposition of alien metal on to ceramic insulation exposed to the chamber interior. The presence of this metal has a deleterious effect on the electrical insulation and/or sealing properties of the ceramic which leads to failure of the chamber. The source of the metal may be either the metallic braze material which forms a gas seal between the ceramic and metal parts of the chamber or it may arise from the boron content of the chamber, for example boron may plate on to the ceramic surfaces from the chamber exposed to the filling gas.

SUMMARY OF THE INVENTION

According to the invention a neutron sensitive detector is provided which comprises a metal body defining a chamber, an anode extending within the chamber in spaced relation to the chamber wall, a ceramic to metal seal through which electrical signals from the anode are lead by a conductor insulated from the body, the ceramic to metal seal having a ceramic portion which protrudes into the chamber to define an extended surface of ceramic material. Preferably the protruding ceramic portion is shielded from the main chamber volume by a shroud.

One effect of the extended surface is to postpone the effect which migrating braze material has in bridging the ceramic surface between the parts insulated by the ceramic; it also provides a greater surface area for possible metal plate out so that the deposition is not on to a concentrated sensitive area.

DESCRIPTION OF THE DRAWING

In order to demonstrate more clearly the invention, a boron trifluoride gas-filled counter which incorporates the invention will now be described with reference to the accompanying drawing which is an axial cross section through a cylindrical counter body, the external electrical connections being omitted.

DESCRIPTION OF THE PREFERRED EMBODIMENT

As shown, the counter comprises a 1 inch diameter aluminum tube 1 closed at each end by aluminum plugs 2, 3. The closed volume of the tube is charged with boron trifluoride gas and a coaxial tungsten anode wire 10 is supported centrally on the tube axis as will be more fully explained below.

The plug 2 has a central aperture bounded by a reentrant portion to the inner end face to which is friction welded a stainless steel sleeve 4. The bore of the sleeve 4 is of stepped diameter and in the smaller bore portion is brazed a metal tube 5 having an internal shoulder. Brazed to the shoulder bore is a ceramic to metal seal feature designated generally at 6 whose function is to form a gas-tight, electrically insulating seal between the wire 10 and the end plug 2 in the casing 1 and permit the necessary ionizing potential between those parts to be maintained. Electrical insulation is provided by a ceramic sleeve 6a which is fixed in a short metal sleeve 6b by a copper-silver braze which also provides a gas-tight seal between these parts. The metal sleeve 6b is itself brazed into the bore of the internal shoulder of the tube 5.

It will be observed that the forward part 7 of the ceramic sleeve 6a extends forwardly into the cylinder volume for no obvious reason. This extension 7 is in fact provided so as to form an extended surface forming a longer path for any migrating material from the copper-silver braze so that such material would take longer to bridge the insulation. Moreover the extended surface provides additional area for the deposition of boron from the chamber atmosphere. Nevertheless, the extension 7 does not extend beyond the terminal part of the tube 5 which in practice shrouds the extended surface area from the main volume of boron containing gas within the tube.

At its rear end face (external of the chamber) the ceramic sleeve 6a abuts and engages and seals against the end of a tube 8, the junction between 6a and 8 being enclosed by a perforated cap 9. The tube 8 supports coaxially within it a long thin walled tube 11 which extends through the plug 2 on the cylinder axis protruding both backwards and forwards of the seal feature 6. At its rear end, the tube 11 is brazed to the wire 10 which is the central anode, collector, electrode of the counter volume. The front end of the tube 11 defines one limit of the active volume of the chamber.

The other end of the active volume is defined by a further tube 12 through which the wire 10 passes. The wire end is here fused into a glass bead 13 which itself is fused on to the tube 12. The tube 12 is a sliding fit in a central hole in a silica disc 14 perforated with holes 15 and fixed peripherally to the cylinder wall. The disc provides one abutment for a spring 13a which bears on the bead 13 and correctly tensions the wire 10. The disc 14 has a number of concentric grooves 14a cut in its faces to increase the electrical length of the surface and hence deminish the effect of substances which reduce the insulating properties of the disc, such as boron.

The end plug 3 is in peripheral sealing engagement with the tube 1. There is a central aperture in it however which receives the filling stem 16. The stem 16 is an aluminum tube through which BF3 gas at the appropriate pressure is introduced into the cylinder. After filling, the stem 16 is crimped and sealed by a sealing weld 17. Finally an end cap 18 is tack welded in place to prevent accidental damage to the stem 16.

A boron counter as described above has been operated and found to exhibit enhanced resistance to the effects of boron plating out from the filling gas on to the internal surfaces of the chamber.

We claim:

1. A neutron sensitive detector comprising a metal body defining a cylindrical gas tight chamber, a volume of BF3 gas contained within said chamber, the chamber having closed ends, a ceramic to metal seal closing one of said ends, an elongated electrode extending coaxially within the chamber in spaced relation to the wall, the electrode being supported at one of its ends in the ceramic to metal seal which electrically insulates the electrode from the metal body, the ceramic to metal seal having a ceramic portion extending into the chamber, and a metal shield shrouding the extended ceramic portion from the atmosphere within the chamber.

2. A neutron sensitive detector as claimed in claim 1 in which the elongated electrode is supported within the chamber at its end remote from the ceramic to metal seal by an annular ceramic member extending from the chamber wall, the member having grooves therein, each said groove having a width greater than its depth.

3. A neutron sensitive detector as claimed in claim 2 in which the electrode is supported in the ceramic member by a tensioning device which holds the electrode in tension.

4. A neutron sensitive detector as claimed in claim 1 in which the electrode is supported in the ceramic to metal seal by a metal alloy braze, the extended surface of the ceramic extending from the metal braze into the chamber, and the metal shield shrouding that extended surface.

5. A neutron sensitive detector as claimed in claim 1 comprising an aluminum tube defining said metal body, a stainless steel sleeve, a friction welded connection joining said sleeve within said tube at one end thereof, the stainless steel sleeve supporting the ceramic to metal seal which in turn supports the electrode.

* * * * *